June 14, 1960 C. D. SMITH ET AL 2,940,537
MEANS AND TECHNIQUES FOR SILENCING SOUND ENERGY
Filed Jan. 4, 1957 4 Sheets-Sheet 1
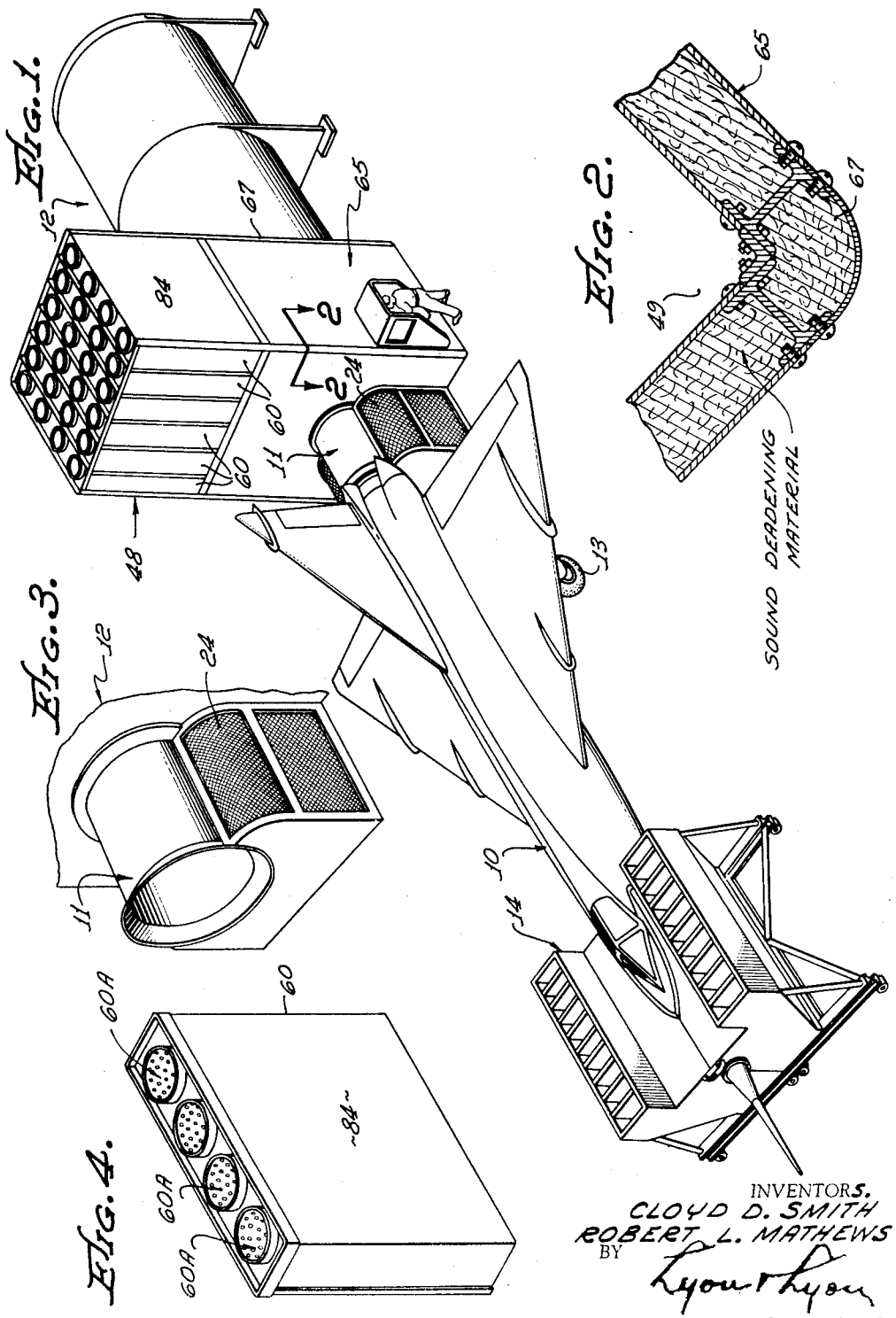
INVENTORS.
CLOYD D. SMITH
ROBERT L. MATHEWS
BY
ATTORNEYS.

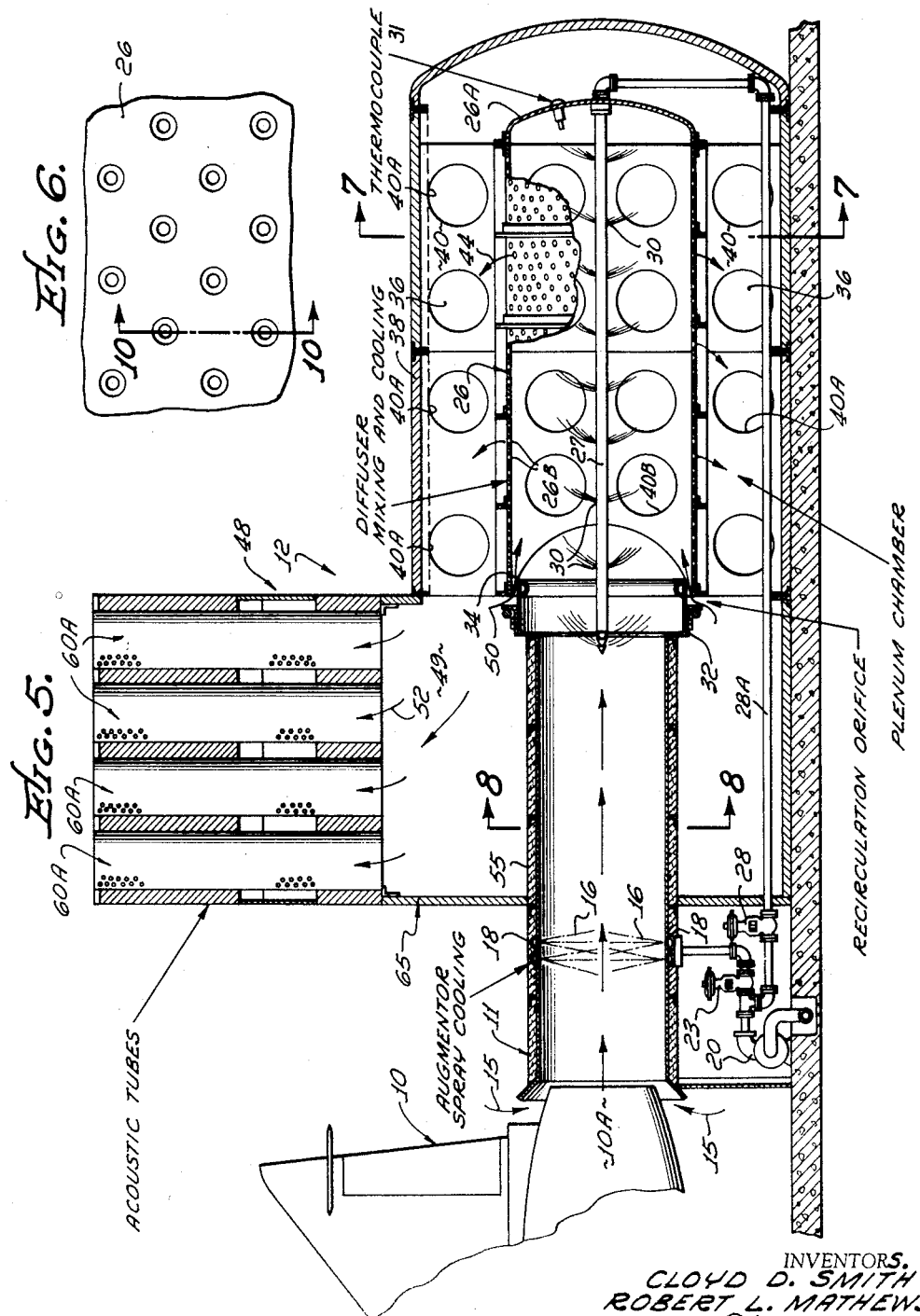

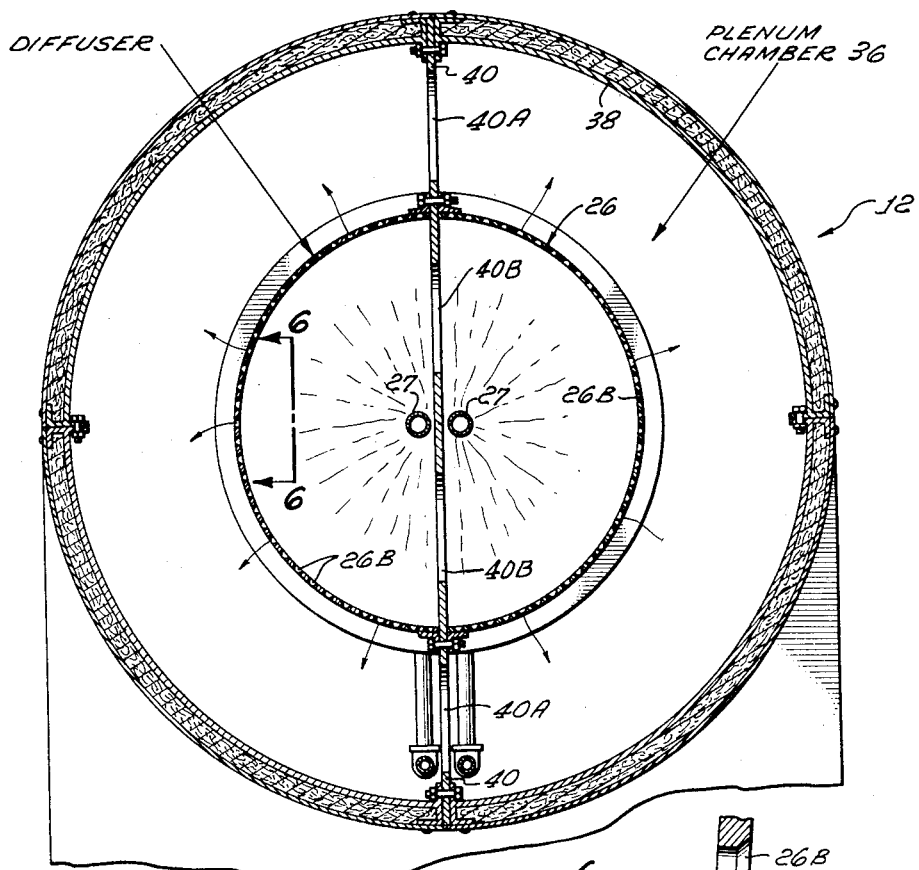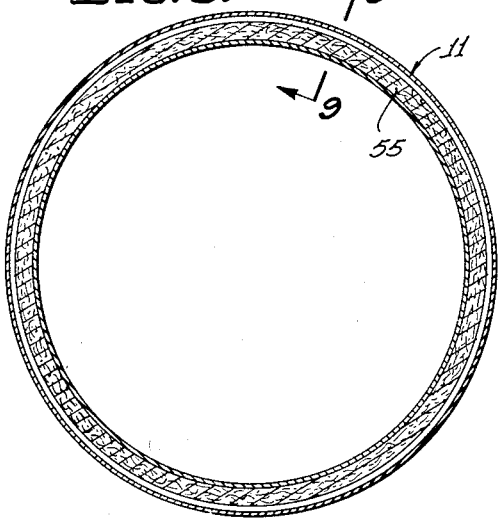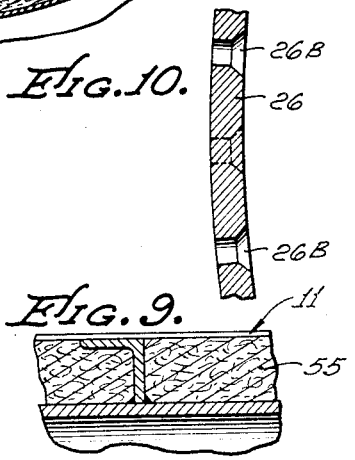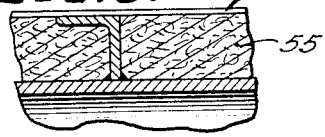

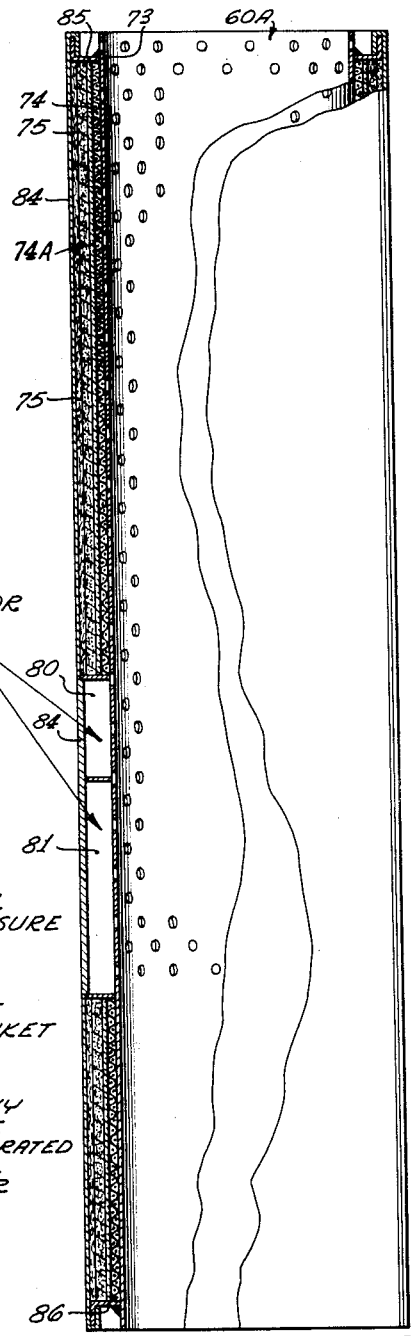

United States Patent Office 2,940,537
Patented June 14, 1960

2,940,537
MEANS AND TECHNIQUES FOR SILENCING SOUND ENERGY

Cloyd D. Smith and Robert L. Mathews, Los Angeles, Calif., assignors to General Sound Control, Inc., Los Angeles, Calif., a corporation of California Filed Jan. 4, 1957, Ser. No. 632,584

5 Claims. (Cl. 181—54)

The present invention relates to improved means and techniques for silencing sound energy, and is particularly useful in structures designed to absorb the objectionable noises created during the ground testing of all types of aircraft and engine. In general, the present arrangement is of an improvement on the system described in co-pending patent application, Serial 574,729, filed March 29, 1956, and assigned to the same assignee.

With the increased use of jet engines, after burners and rocket engines, the noise levels are not only objectionable but are shown by scientific tests to be, in some cases, detrimental to the health of the personnel in the immediate vicinity.

In order to obtain valid test data with a minimum of corrective calculations on ground tests of aircraft and engines, it is of great importance to keep the test cell back pressures at a minimum.

For this purpose, as well as cost and space requirements, it is desirable that the flow path for the exhaust gases be of relatively short length. This means that sound energy is required to be absorbed efficiently while the exhaust gases travel through the desired short path. This is accomplished in accordance with one feature of the present invention by creating a coaxial flow pattern such that a portion of the gases is recirculated through a portion of the sound absorbing structure before the gases leave the exhaust stack.

A general object of the present invention is to provide improved sound absorbing systems and components therefor for obtaining the above-mentioned desirable results.

A specific object of the present invention is to provide an improved sound absorbing structure of this character which is relatively small and comparatively inexpensive.

Another specific object of the present invention is to provide an improved system of this character in which a portion of the gases in its coaxial travel through the sound-absorbing structure is caused to be recirculated so that such gases are subjected to the same sound absorbing path, before the gases leave the exhaust stack.

Another specific object of the present invention is to provide a coaxial system of this character having means for recirculating a portion of the exhaust gases through a path into which water is sprayed, also for purposes of reducing the energy of the gases.

Another specific object of the present invention is to provide an improved sound absorbing structure in which objectional noise due to operation of jet engines is effectively absorbed or deadened without producing any substantial interference in the operation of such jet engines.

Another specific object of the present invention is to provide an improved sound absorbing structure which includes units through which gases may be passed at extremely high velocities without destroying the effectiveness of such units.

Another specific object of the present invention is to provide improved sound absorbing structures in which novel units are arranged in a novel manner.

Another specific object of the present invention is to provide improved sound absorbing structures of this character, having as an important feature the fact that it can be shipped in components or sections and bolted together at the site at which it is to be used for silencing purposes; and indeed so that it can be disassembled and moved to a new location for silencing purposes if desired.

Another specific object of the present invention is to provide improved sound absorbing structures of this character in which the attendant maintenance and serviceability are aided by the fact that any damaged portions can be easily replaced by new sections.

Another specific object of the present invention is to provide improved sound absorbing structures of this character which are adaptable so that the silencer length may be increased as well as the stack height for use with larger aircraft engines that may be built in the future.

The features of the present invention which are believed to be novel are set forth with particularity in the appended claims. This invention itself, both as to its organization and manner of operation, together with further objects and advantages thereof, may be best understill by reference to the following description taken in connection with the accompanying drawings in which:

Figure 1 is a perspective view illustrating a jet aircraft arranged to expel its exhaust gases into a sound absorbing structure embodying features of the present invention.

Figure 2 is a sectional view taken substantially on the line 2—2 of Figure 1.

Figure 3 is a perspective view showing in enlarged form, a portion of the structure shown in Figure 1.

Figure 4 is a perspective view showing one section of the stack construction, also shown in Figure 1.

Figure 5 is a longitudinal sectional view through the sound absorbing structure shown in Figure 1.

Figure 6 is a view taken generally in the direction indicated by the line 6—6 in Figure 7.

Figure 7 is a sectional view taken substantially on the line 7—7 of Figure 5.

Figure 8 is a sectional view taken on the line 8—8 of Figure 5.

Figure 9 is a sectional view taken on the line 9—9 of Figure 8.

Figure 10 is a sectional view taken on the line 10—10 of Figure 6.

Figure 11 is a top plan view of a portion of the stack structure shown in Figure 1, with a part thereof fragmented and showing internal structure.

Figure 12 is a transverse sectional view through two of the stack elements.

Figure 13 is a longitudinal sectional view through one of the stack elements.

Referring to the drawings, Figure 1 illustrates a jet aircraft 10 wheeled into a position wherein the exhaust outlet is in communication with the inlet or augmenter tube 11 of the silencer unit 12. The aft end of the aircraft is supported by its ground engaging wheel 13, and the nose section of the aircraft is enclosed by the intake silencer 14, the aircraft being supported by its landing gear.

The intake silencer 14 encircles a portion of the nose section of the aircraft and is provided with acoustical panel louvered ducts through which the intake air for the aircraft passes.

It is noted that the aircraft 10 as shown in Figure 5 has its exhaust outlet 10A generally within the confines of the outer end of the augmenter tube 11, and axially aligned therewith so that the exhaust gases entering the tube 11 cause the surrounding air to also move into the tube 11, by suction, as indicated by the arrows 15. Thus, there is a mixture of the exhaust gases and air in the augmenter tube 11, and such mixture is cooled by its intermingling with the water spray 16, to thereby achieve a rapid cooling. In some cases the exhaust outlet is contacted by an annular "muff" which may or may not allow "secondary air" to enter for cooling of the exhaust gases; and when used, the "muff" serves as an acoustical trap in either case.

The water spray 16 emerges from suitably arranged spray heads 18 mounted in the inner wall of tube 11; and water is fed to such spray heads 18, using a water pump 20 and suitable conduits in which is interposed a suitable automatically controlled valve 23. Such associated valve and control equipment are disposed below the forward end of the tube 11 and enclosed in a screened housing 24 (Figure 1).

The cooled mixture flows from the tube 11 into the perforated tank or diffusing chamber 26, having water supply pipes 27 aligned along the longitudinal axis of the tank 26.

The pipes 27 are supplied with water from the pump 20 through the automatically operated valve 28, and have a plurality of water nozzles 30 spaced along their length to produce a plurality of water sprays in chamber 26 as indicated in Figure 5. These pipes 27 may be connected to the outlet of valve 28 through suitable conduits and a Y fitting. The thermocouple 31 is mounted on the tank wall 26A and senses the temperature inside the tank 26. The valve 28 is controlled in accordance with the output of the thermocouple to maintain a condition in the diffuser 26, for example, a substantially constant temperature.

It is noted that the diffuser 26 has its forward end open, into which extends an enlarged tube 32 which forms an extension of the smaller diameter tube 11, such that an annular gas passage 34 is provided between the tubular extension 32 and the forward end of the diffuser 26. This annular space 34 provides a path for recirculation of gases as explained in more detail later.

The cylindrical wall of the diffuser 26 is perforated, but its other end is closed by a solid arcuate shaped wall 26A so that the mixture entering the diffuser 26 leaves the tube 26 only through the apertures in the cylindrical wall, i.e., into the surrounding plenum chamber 36.

The plenum chamber 36 is defined as the space between the diffuser 26 and the inner surface of the outer cylindrical housing 38.

It is noted that the cylindrical diffuser 26 is maintained centrally, although it may be maintained eccentrically, within the outer cylindrical housing 38 by radially extending spacer plates or braces 40 interconnecting these two elements, and that such spacer plates 40 are provided with large circular aperture portions 40A through which the gas mixture may pass in a circumferential direction through the above defined plenum chamber 36. Also, such spacer plates 40 have enlarged aperture portions 40B inside the chamber 26 to allow free flow of the gas mixture within the chamber 36.

The gases thus entering the plenum chamber 36 undergo a change in direction of 90 degrees as indicated by the arrow 44 in Figure 5; and in general the flow of gases through the plenum chamber 36 towards the stack 48 is in a direction opposite to the general flow of gases within the diffuser 26. The gases after they leave the plenum chamber 36 flow into the chamber 49 immediately below the stack 48 but, however, a portion of such gases is caused, by suction, to flow through the aforementioned annular space 34, as indicated by the arrow 50, to be recirculated through the diffuser 26. Such recirculated gases again pass through the plenum chamber 26, and into chamber 49 from where they may again be recirculated or flow upwardly through the stack 48, as indicated by the arrow 52.

In general, the augmenter tube 11, which allows the entrance of surrounding air, and into which a water spray is injected, serves to provide a rapid cooling of the gases. Further cooling is accomplished in the diffuser 26 and in general, the perforated diffuser 26 serves to raise the noise spectrum to higher frequencies, so that such noise may be more efficiently and effectively attenuated in relatively short length tubes comprising the stack 48. One function of the plenum chamber 36 and the interconnected chamber 49 is to reduce the velocity of the gases.

It is observed, that with the counter flow system provided, heat transfer between the gases within the augmenter tube 11 and gases in the chamber 49 is minimized by the sound and heat insulating material 55 which serves as a covering for tube 11.

Some of the gases in the chamber 49 are recirculated through the annular space 34, as previously described by conventional ejector pump action.

The aperture portions 26B in diffuser 26, as indicated previously, serve as a converter of noise frequencies, by converting noise energy of low frequency to noise energy of higher frequency. Because of the restricted passages in the outer cylindrical wall of chamber 26, defined by the series of restricted openings 26B, the velocity of the gas mixture is increased when and as it passes through such restricted openings to obtain the well-known effect of a conventional whistle; i.e., to obtain a high pitch noise. Since the energy producing the resulting high pitch noise is derived from and is at the expense of energy in the original gas mixture which emits noise at a lower frequency, the aperture portions or openings 26B are referred to as a means for converting low frequency noise energy to high frequency noise energy. As described later, these apertures 26B have a special cross-sectional shape to bring about such energy conversion efficiently; i.e., to aid in such energy conversion. The acoustic treated tubes 60, comprising the stack 48, are acoustically tuned to such higher frequencies and in general are provided with sound absorbing material to absorb not only high frequency noise but to a lesser degree also low frequency noise.

The stack 48 is shown comprises six sections 60 (Figure 4) of tubes with each section having four tubular portions 60A, although in some cases more or less than six sections may be used. The individual sections 60 are bolted together as indicated in Figure 11, by bolts 61 and the assembly of sections is mounted on the base 65 which is essentially an insulated frame as shown in Figure 2. This base structure 65 defines generally the aforementioned chamber 49 and the corners 67 thereof extend the full length of the stack as shown in Figure 1.

Each section 60 is in the form of a rectangular metal box containing the four tubes 60A separated by sound absorbing material 70. The inner layer of each tube 60A comprises a heavy gauge perforated steel liner 73. The second circular layer 74 is a multiple layer corrugated wall mesh, the third layer 74A is a glass cloth protective casing and the outer layer is a tubular blanket 75 of sound absorbing material, a so-called T.W.F. blanket which is enclosed by the metallic cylinder 84 having its opposite ends bent over flanged rings 85, 86, these rings 85, 86 being secured to the inner lining 73. The term "T.W.F." as used above has reference to a loose pack of fibrous material made from glass fibre as manufactured under the trade name T.W.F. of Fibre Glass Co. Such sound absorbing material may also be of rock wool and the like.

It is noted that two annular resonating chambers 80, 81 are provided intermediate the ends of each tube 60A, as shown in Figure 13.

These two chambers 80, 81 are defined by the inner lining 73 and the outer metallic cylinder 84 which confines the aforementioned sound absorbing material, and are of different size so as to be resonant at different frequencies related in an acoustic sense to the frequency of the energy leaving the frequency restricted openings 26B (Figure 10) in the diffuser 26. As seen in Figure 10, these openings 26B preferably are each defined by a frusto conical section in series with a contiguous cylindrical section in that order from the interior of chamber 26 to the plenum chamber 36.

It is noted that the absorptive blankets in the stack tubes 60 in general absorb energy at all frequencies and are more effective however at the higher frequencies, while the resonating chambers in such stack tubes aid in dissipating the lower frequencies. The diffuser holes or apertures illustrated in Figure 6 aid in converting low frequency energy to high frequency energy. The resonating chambers in the stack serve to absorb energy at all frequencies and are more effective however in eliminating or absorbing the low frequency sound energy in the stack.

It is readily seen, from this construction, that the individual sections of the sound absorbing structure described above are such that they may be readily bolted together for convenience in shipping, assembly, disassembly, replacement and for ease of maintenance and servicing.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A test stand comprising, in combination, a housing having a sound and heat insulated front rectangular section, and a sound and heat insulated rear cylindrical section, a sound and heat insulated augmenter tube in said front section and extending generally horizontally and outwardly of said housing, said tube having a flared inlet opening for receiving gases as well as ambient air due to the velocity of such gases entering said inlet opening, means in said housing producing a water spray in said tube which intermingles with said gases and air to reduce the temperature of said gases, said tube having an enlarged outlet opening, an open-ended perforated cylindrical diffuser in said rear cylindrical section of the housing and extended generally horizontally with the open end thereof in communication with and spaced from said outlet opening to provide an annular space between said tube and said diffuser, said diffuser having a closed end remote from its open end, said closed end serving as a baffle for said gases, apertured spacer plates extending between said diffuser and said rear cylindrical housing section so that said rear housing section is spaced from and encloses said diffuser to provide a generally annular plenum chamber between the rear housing section and outer wall of said diffuser, means for producing a water spray in said diffuser to further cool the gases entering into the same, the cylindrical diffuser having a plurality of spaced apertured portions therein communicating the interior of said diffuser with said plenum chamber, said apertured portions each comprising a restricted passage defined by a generally conical section contiguous with and in communication with a cylindrical section serving to convert the frequency of the energy of the gases from a relatively low frequency to a relatively high frequency, a generally rectangular stack mounted above said front section and laterally of said diffuser, said stack being in communication with the forward end of said plenum chamber and having a plurality of sound-absorbing open ended tubes therein, said tubes in said stack also having resonant chambers intermediate the ends thereof in communication with the interior of said last named tubes which are substantially resonant, the gases in their passage from the plenum chamber to the stack being subjected to suction forces at said annular space developed by said gases in their passage from said augmenter tube to said diffuser so that a portion of the gases in the plenum chamber is drawn through said annular opening and recirculated through said diffuser and plenum chamber.

2. A test stand comprising, in combination, a housing having a front section and a rear section, an augmenter tube in said front section and extending generally horizontally and outwardly of said housing, said tube having an inlet opening for receiving gases as well as ambient air due to the velocity of such gases entering said inlet opening, means in said housing producing a water spray in said tube which intermingles with said gases and air to reduce the temperature of said gases, said tube having an outlet opening, an open-ended perforated diffuser in said rear section of the housing and extended generally horizontally with the open end thereof in communication with and spaced from said outlet opening to provide an annular space between said tube and said diffuser, said diffuser having a closed end remote from its open end, said closed end serving as a baffle for said gases, apertured spacer plates extending between said diffuser and said rear housing section so that said rear section is spaced from and encloses said diffuser to provide a plenum chamber between the rear housing section and the outer wall of said diffuser, means for producing a water spray in said diffuser to further cool the gases entering into the same, the diffuser having a plurality of spaced apertured portions therein defining restricted passages and communicating the interior of said diffuser with said plenum chamber, said apertured portions serving to convert the frequency of the energy of the gases from a relatively low frequency to a relatively high frequency, a stack mounted above said front section and laterally of said diffuser, said stack being in communication with the forward end of the plenum chamber and having a plurality of sound-absorbing open ended tubes therein, said tubes in said stack also having resonant chambers in communication with the interior of said last named tubes, the gases in their passage from the plenum chamber to the stack being subjected to suction forces at said annular space developed by said gases in their passage from said augmenter tube to said diffuser so that a portion of the gases in the plenum chamber is drawn through said annular opening and recirculated through said diffuser and plenum chamber.

3. A test stand comprising, in combination, a housing, an augmenter tube in said housing and extending generally horizontally and outwardly of said housing, said tube having an opening for receiving gases as well as ambient air due to the velocity of such gases entering said opening, an open-ended diffuser in said housing and extended generally horizontally with the open end thereof in communication with and spaced from the outlet of said tube to provide an annular space between said tube and said diffuser, said diffuser having a closed end remote from its open end, said closed end serving as a baffle for said gases, apertured spacer plates extending between said diffuser and said housing so that said housing is spaced from and encloses said diffuser to provide a plenum chamber between the housing and the outer wall of said diffuser, the diffuser having a plurality of spaced apertured portions therein defining restricted passages and communicating the interior of said diffuser with said plenum chamber and serving to convert the frequency of the energy of the gases from a relatively low frequency to a relatively high frequency, a stack mounted laterally of said diffuser, said stack being in communication with the forward end of the plenum chamber and having a plurality of sound-absorbing open ended tubes therein, said tubes in said stack also having resonant chambers in communication with the interior of said last named tubes, the gases in their passage from the plenum chamber to the stack being subjected to suction forces at said annular space developed by said gases in their passage from said augmenter tube to said diffuser so that a portion of the gases in the plenum chamber is drawn through said annular opening and recirculated through said diffuser and plenum chamber.

4. A test stand comprising, in combination, a housing, an augmenter tube in said housing and extending outwardly of said housing, said tube having an inlet opening for receiving gases as well as ambient air due to the velocity of such gases entering said inlet opening, said tube having an outlet opening, a perforated diffuser in said housing in communication with said outlet opening, said diffuser having a closed end remote from its open end, said closed end serving as a baffle for said gases, apertured spacer plates extending between said diffuser and said housing so that said housing is spaced from and encloses said diffuser to provide a plenum chamber between the housing and the outer wall of said diffuser, the diffuser having a plurality of spaced apertured portions therein defining restricted passages and communicating the interior of said diffuser with said plenum chamber and serving to convert the frequency of the energy of the gases from a relatively low frequency to a relatively high frequency, a stack mounted above said diffuser and in communication with said plenum chamber, said stack having a plurality of sound-absorbing open ended tubes therein, said tubes in said stack also having resonant chambers in communication with the interior of said last named tubes.

5. A test stand comprising, in combination, a housing, an augmenter tube in and extending generally horizontally and outwardly of said housing, said tube having an inlet opening for receiving gases as well as ambient air due to the velocity of such gases entering said inlet opening, said tube having an outlet opening, an open-ended perforated cylindrical diffuser in said housing and extended generally horizontally with the open end thereof in communication with and spaced from said outlet opening to provide an annular space between said tube and said diffuser, said diffuser having a closed end remote from its open end, said closed end serving as a baffle for said gases, apertured spacer plates extending between said diffuser and said housing so that said housing is spaced from and encloses said diffuser to provide a generally annular plenum chamber between the housing and the outer wall of said diffuser and in communication with said plenum chamber, a stack mounted above said diffuser, said stack being in communication with the forward end of the plenum chamber and having a plurality of sound-absorbing open ended tubes therein, the gases in their passage from the plenum chamber to the stack being subjected to suction forces at said annular space developed by said gases in their passage from said augmenter tube to said diffuser so that a portion of the gases in the plenum chamber is drawn through said annular opening and recirculated through said diffuser and plenum chamber.

References Cited in the file of this patent

UNITED STATES PATENTS

| | | |
|---|---|---|
| 1,539,595 | Powell | May 26, 1925 |
| 1,658,402 | Warth | Feb. 7, 1928 |
| 2,056,608 | Jack | Oct. 6, 1936 |
| 2,081,306 | Rauen | May 25, 1937 |
| 2,600,262 | Powers | June 10, 1952 |
| 2,685,936 | Brenneman et al. | Aug. 10, 1954 |
| 2,720,276 | Droeger | Oct. 11, 1955 |
| 2,845,775 | Tyler et al. | Aug. 5, 1958 |

FOREIGN PATENTS

| | | |
|---|---|---|
| 521,636 | Belgium | Aug. 14, 1953 |
| 766,985 | Great Britain | Jan. 30, 1957 |